United States Patent [19]

Larner et al.

[11] Patent Number: 5,010,321
[45] Date of Patent: Apr. 23, 1991

[54] NUCLEAR EVENT DETECTORS

[75] Inventors: David J. Larner, Lynsted; Clive D. Goodchild, Northfleet, both of England

[73] Assignee: Gec-Marconi Limited, England

[21] Appl. No.: 416,052

[22] Filed: Oct. 2, 1989

[30] Foreign Application Priority Data

Oct. 5, 1988 [GB] United Kingdom ................ 8823398

[51] Int. Cl.⁵ ............................................. G08B 17/12
[52] U.S. Cl. ................................. 340/600; 250/336.1
[58] Field of Search ........... 340/600, 540, 693, 309.15; 250/336.1, 302

[56] References Cited

U.S. PATENT DOCUMENTS

| | | | |
|---|---|---|---|
| 4,219,804 | 8/1980 | Weishedel | 340/600 |
| 4,336,532 | 6/1982 | Biehl et al. | 340/600 |
| 4,363,965 | 12/1982 | Soberman et al. | 250/302 |
| 4,598,202 | 7/1986 | Koechner | 340/600 X |
| 4,742,340 | 5/1988 | Nowik et al. | 340/600 X |
| 4,862,143 | 8/1989 | Hirschfield et al. | 340/600 X |

OTHER PUBLICATIONS

EDN Electrical Design News, vol. 30, Aug. 1985, pp. 133-140, Longden & Trippe; "Hybrid Detector Protects Circuits from Radiation".
IEEE Transactions on Nuclear Science, vol. NS33, No. 1, Feb. 1986, pp. 347-350, Lerose et al., "Microstrip Detectors with Inverted Structure".

Primary Examiner—Glen R. Swann, III
Assistant Examiner—Thomas J. Mullen, Jr.
Attorney, Agent, or Firm—Kirschstein, Ottinger, Israel & Schiffmiller

[57] ABSTRACT

An arrangement for protecting selected devices of an electronic equipment from radiation, e.g. resulting from a nuclear event, including a timing circuit (13) responsive to the output of a radiation sensing device (11) first to operate a first switch (35a) to isolate a power supply rail for the devices from the power supply to the equipment when the radiation level exceeds a predetermined level, and then to operate a second switch (35b) to ground the supply rail, thereby shunting to ground residual stored energy in devices connected to the rail.

4 Claims, 1 Drawing Sheet

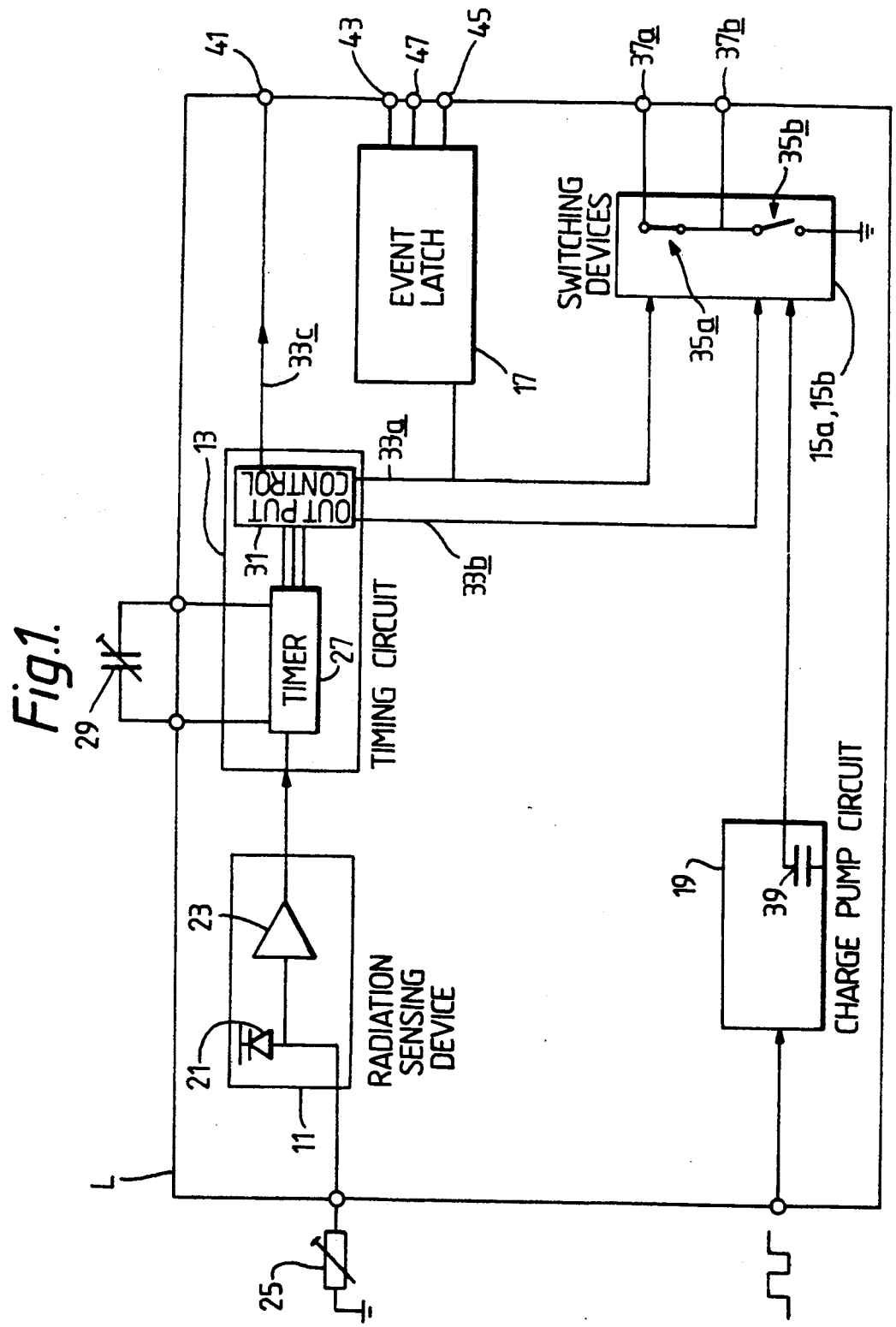

NUCLEAR EVENT DETECTORS

BACKGROUND OF THE INVENTION

1. Field of the Invention

This invention relates to nuclear event detectors and more particularly to such detectors for use in the protection of electronic equipment, especially digital electronic equipment, against the induced electrical effects of radiation, more especially gamma radiation.

2. Description of Related Art

Such a nuclear event detector is triggered into action by radiation at a flux level liable to upset or cause damage to the electronic equipment to be protected. The components of electronic equipment which particularly require to be protected are, of course, semiconductor devices. During gamma irradiation all biased semiconductor PN junctions generate a photocurrent proportional to the gamma dose rate, thus producing upset, latchup and burnout of the semiconductor devices containing such junctions. In the case of CMOS devices particularly latch up (logic elements within device being held in a fixed state) will cause the device to burnout unless the device is current limited or the power removed.

A nuclear event detector for use in protection of electronic equipment therefore includes circuit means for depowering semiconductor devices in the equipment on detection of a gamma radiation event.

In the past designers have used circuit means, utilising for example an SCR (Silicon Controlled Rectifier), single power transistors or MOSFETS, that depower the whole equipment after detecting a gamma event. However, it is often the case that not all devices require protection. Moreover, it would be desirable to arrange for some devices to retain power during and after the event to retain essential system data. By using a nuclear event detector that only locally depowers susceptible devices, the time to re-initialise the equipment e.g. computers therein, could be greatly reduced, and essential data retained in 'hard' memory.

SUMMARY OF THE INVENTION

It is an object of the present invention to provide a nuclear event detector which is suitable for use in effecting local depowering of susceptible devices only.

According to the present invention there is provided a nuclear event detector comprising: radiation sensing means which produces an output in response to the incidence thereon of radiation above a threshold level; a timing circuit responsive to the output of the sensing means to produce first and second control signals; a first terminal for connection to a first power supply line for devices of an equipment which are not to be protected on the occurrence of a nuclear event; a second terminal for connection to a second supply line for devices of the equipment which are to be protected on the occurrence of a nuclear event; a first electrical switching device which provides a normally closed first switch path between said first and second terminals; and a second electrical switching device which provides a normally open second switch path between said second terminal and ground; said first and second switching devices being controlled by said first and second control signals respectively so that in response to the incidence of radiation on said sensing means above said threshold level said first switch path opens, thereby to isolate said second power supply line of the equipment from said first power supply line; and thereafter said second switch path closes, thereby to shunt to ground residual stored electrical energy in devices connected with said second power line.

Preferably, the event detector further includes an event latch device connected to receive a control signal from the timing circuit and settable thereby to a predetermined interrogatable state representative of the event.

Preferably the switch paths of the first and second switching devices comprise power MOSFET devices.

Conveniently the switching devices are energised from a charge pump circuit.

BRIEF DESCRIPTION OF THE DRAWING

One nuclear event detector in accordance with the invention will now be described by way of example with reference to the sole figure of the accompanying drawing which is a schematic diagram of the detector.

DETAILED DESCRIPTION OF THE PREFERRED EMBODIMENTS

The detector is implemented in discrete or hybrid package form, the boundary of which package is indicated by the heavy line L in the drawing.

The detector includes: a radiation sensing device 11; a timing circuit 13; first and second electrical switching devices 15a, 15b; an event latch device 17; and a charge pump circuit 19.

The radiation sensing device 11 includes a radiation sensor 21, typically a photodiode, and an amplifier 23 to whose input the voltage appearing across the sensor 21 is applied, the output of the amplifier 23 constituting the output of the sensing device 11. The gain of the amplifier 23 is arranged to be controlled by a variable value component means 25 outside the event detector package, thereby to allow the radiation threshold level at which the device. 11 provides an output to be set, as required. The component 25 typically comprises a resistor connected between ground and an appropriate point in the circuit of the device 11, e.g. the junction between sensor 21 and amplifier 23 as depicted in the drawing.

The timing circuit 13, which has its input connected to the output of the device 11, comprises a timer circuit 27 associated with means 29 e.g. a variable capacitor, outside the event detector package, for varying timing signals developed thereby, and an output control circuit 31 which receives the timing signals developed by the timer circuit 27 and in response thereto develops control signals in -F predetermined timed relationship at outputs 33a, 33b thereof respectively.

The switching devices 15a, 15b respectively incorporate a first switch path 35a and a second switch path 35b, the switch paths 35a, 35b being provided by power MOSFET devices. The first switch path 35a is connected between first and second terminals 37a and 37b of the event detector, and the second switch path is connected between the terminal 37b and ground.

In normal operation of the detector, i.e. in the absence of a nuclear event, the switch path 35a is closed and the switch path 35b is open, as shown in the drawing.

The switching devices 15a, 15b are controlled by the control signals appearing at the outputs 33a and 33b of the output control circuit 31 of the timing circuit 13, as further described below.

The switching devices 15a, 15b are energised from the charge pump circuit 19 which is driven by pulses, suitably derived from a clock pulse generator in the equipment to be protected by the event detector (not shown), to provide a supply voltage for the switching devices 15a, 15b typically of value 15 volts, across an output capacitor 39 of the charge pump circuit 19.

The output control circuit 31 of the timing circuit 13 incorporates an open collector transistor (not shown) whose collector is connected to an output 33c of the circuit 31. The output 33c is connected to an output terminal 41 of the event detector to provide thereat a pulse which is used to inform data processing means in the equipment to be protected that a nuclear event has occurred.

The event latch 17 is operative to store a data bit in the event of the appearance of a signal at the output 33a of the output control circuit 31 indicative of the occurrence of a nuclear event. The event latch 17 is interrogated by a read signal applied to the latch 17 via a terminal 43 of the event detector, whereupon the data bit stored in the latch, if present, due to occurrence of a nuclear event, appears at a terminal 45 of the event detector. The latch 17 is reset by application of a pulse via a terminal 47 of the event detector.

In use of the event detector the terminal 37a is connected to a main power supply line of the equipment to be protected. Devices in the equipment which do not require protection on the occurrence of a nuclear event are supplied directly from this power supply line. Devices in the equipment which do require such protection are supplied via a secondary power supply line of the equipment connected to the terminal 37b of the event detector. As stated above, in the absence of a nuclear event the switch paths 35a and 35b are respectively closed and open so that all the devices in the equipment are connected to the main supply line of the equipment for energisation therefrom, the devices to be protected being connected thereto via the switch path 35a.

On occurrence of a nuclear event resulting in detection of gamma radiation by the sensor 21 above the threshold level set by component 25, the timing circuit 13 produces a control signal at its output 33a which is applied to the switching device 15a so as to cause the switch path 35a to open, thereby cutting off the power supply to the devices to be protected whilst the supply to other devices in the equipment is maintained. Momentarily after the appearance of the control signal at output 33a, after a time determined by component 29, the timing circuit 13 produces a control signal at its output 33b which is applied to switching device 15b so as to cause the switch path 35b to close, thereby grounding the terminal 37b and hence the secondary supply line of the equipment, and shunting any residual stored energy in the devices to be protected and associated circuitry to ground. It will be appreciated that due to the switch path 35a being open at this time, closure of the switch path 35b does not effect the supply of power to the devices which are not to be depowered on the occurrence of a nuclear event. Thus the event detector enables both cut off of the supply to the devices to be protected and shunting of residual stored energy in respect of the devices without interruption of the supply to the devices which are not to be depowered.

It will be understood that whilst power MOSFETS provide the switch paths 15a, 15b in the event detector described by way of example, in other event detectors according to the invention any high speed switching elements having very low switch path resistance may be used instead.

It will be understood that an event detector according to the invention will be constructed so as to itself be substantially unaffected by gamma radiation. This can be achieved using known current limiting and compensation techniques in the circuits of the event detector.

It will further be understood in this connection that whilst in the event detector described by way of example only the variable components 25, 29 are outside the detector package, in other arrangements according to the invention other components, in particular the power switching devices 15a, 15b, may be outside the package.

We claim:

1. A nuclear event detector for use in the protection of electronic equipment having a plurality of devices, comprising: radiation sensing means for producing an output in response to the incidence thereon of radiation above a threshold level; timing circuit means responsive to the output of the sensing means for producing first and second control signals; a first terminal for connection to a first power supply line for first devices of the equipment which are not to be protected on the occurrence of a nuclear event; a second terminal for connection to a second supply line for second devices of the equipment which are to be protected on the occurrence of a nuclear event; controllable first electrical switching means for providing a normally closed first switch path between said first and second terminals; and controllable second electrical switching means for providing a normally open second switch path between said second terminal and ground; said first and second switching means being controlled by said first and second control signals respectively so that in response to the incidence of radiation on said sensing means above said threshold level said first switch path opens, thereby to isolate said second power supply line from said first power supply line; and thereafter said second switch path closes, thereby to shunt to ground residual stored electrical energy in said second devices connected with said second power supply line.

2. A detector according to claim 1 further including an event latch device connected to receive one of said control signals from the timing circuit means and settable thereby to a predetermined interrogatable state indicative of the incidence of radiation of said sensing means above said threshold level.

3. A detector according to claim 1 wherein said switch paths comprise power MOSFET devices.

4. A detector according to claim 1 wherein said switching means are energized from a charge pump circuit.

* * * * *